United States Patent

Hanson et al.

[11] Patent Number: 5,468,392
[45] Date of Patent: Nov. 21, 1995

[54] SUBMERGED FIXED-FILM BIOLOGICAL WASTE TREATMENT METHOD AND SYSTEM

[75] Inventors: Christopher D. Hanson, Arvada; Charles L. Meurer, Golden, both of Colo.

[73] Assignee: Meurer Research, Inc., Golden, Colo.

[21] Appl. No.: 159,986

[22] Filed: Nov. 26, 1993

[51] Int. Cl.$^6$ .................................................. C02F 3/10
[52] U.S. Cl. .................... 210/615; 210/620; 210/150; 210/220
[58] Field of Search ............................. 210/150, 151, 210/220, 615, 620

[56] References Cited

U.S. PATENT DOCUMENTS

| | | | |
|---|---|---|---|
| 3,617,541 | 11/1971 | Pan | 210/150 |
| 3,929,630 | 12/1975 | Smith | 210/17 |
| 4,169,050 | 9/1979 | Serfling et al. | 210/12 |
| 4,294,694 | 10/1981 | Coulthard | 210/150 |
| 4,422,930 | 12/1983 | Hatanaka | 210/150 |
| 4,680,111 | 7/1987 | Ueda | 210/150 |
| 5,085,766 | 2/1992 | Born | 210/150 |
| 5,096,579 | 3/1992 | Jordan et al. | 210/150 |
| 5,262,051 | 11/1993 | Iwatsuka | 210/615 |

FOREIGN PATENT DOCUMENTS 2825866  10/1978  Germany.
2106493  4/1983  United Kingdom.

OTHER PUBLICATIONS

High Biomass Secondary Treatment Systems, by Condren, Heidman & Rusten, Circa 1988, pp. 1–18, EPA.

Primary Examiner—Christopher Upton
Attorney, Agent, or Firm—Chester E. Martine, Jr.

[57] ABSTRACT

Apparatus and method for controlling the positioning of substrates for supporting bacteria in a waste treatment container use an aerator manifold which supplies bubbles of gas to the container from adjacent the bottom of the container. A hollow open mesh tube forms the substrate and is extended under the manifold to define a leg extending upwardly from each side of the manifold. A buoyant array piece is secured to each such end and urges the tube upwardly toward the upper surface of the waste. The bubbles establish a rolling upward flow of the waste in the container between the legs of the tube, which urges the buoyant array pieces apart both during the treatment operation and during draining of the container. Such urging during draining urges the buoyant array pieces away from the manifold, which pieces carry the ends of the tube away from the manifold as they become located lower in the basin. Such urging avoids tangling of the tubes with the manifold and facilitates more efficient cleaning of the manifold. Units of the array pieces are formed by clipping the array pieces together in various configurations, which additionally assists in keeping the array pieces and tubes away from the manifold.

19 Claims, 6 Drawing Sheets

SUBMERGED FIXED-FILM BIOLOGICAL WASTE TREATMENT METHOD AND SYSTEM

BACKGROUND OF THE INVENTION

1. Field of the Invention

This invention relates to promoting the growth, survival and productivity of bacteria for treating waste, and more particularly, to providing submerged fixed-film sites in combination with aerators for promoting bacterial growth in waste water, wherein the sites are organized in arrays for both efficient treatment operation and ease of maintenance.

2. Description of Prior Art

The use of inert support media as the locus of fixed film biomass growth dates to the 1930's. More recently, efforts have been made to use fixed bacterial film substrates in lagoons and other natural basins for holding liquid waste. In one example shown in U.S. Pat. No. 4,169,050 to S. A. Serfling issued Sep. 25, 1979, anchors such as elongated weighted members rest at spaced locations on the bottom of a pond or lagoon. Elongated buoyant substrates are provided with a pair of ends. A center of each elongated substrate is clipped to the anchor to allow the ends thereof to freely float toward the surface and form a buoyant, flexible permeable curtain. Between the spaced anchors, air diffusers are placed on the bottom of the lagoon to provide oxygen for metabolism of the bacteria.

Because the ends of the elongated substrates float freely in turbulence of the liquid waste induced by the bubbles, the substrates can become tangled during waste treatment. Even as important, upon draining the liquid waste from the lagoon during maintenance, the substrates can become tangled or become further tangled as the loose ends of the substrates settle at the bottom of the lagoon on the air diffusers. The substrates can thus interfere with efforts to clean and service the diffusers. When treatment plant personnel enter the lagoon to clean the air diffusers, they must first move the tangled substrates to expose the air diffusers. As a result, the maintenance process becomes disagreeable to the personnel, takes longer, and increases operational costs of treating the liquid waste.

In the late 1980's, the Environmental Protection Agency sponsored a study of a number of systems based on modifying activated sludge aeration tanks to provide various types of inert media to support fixed film biomass growth. It was reported that there appeared to be six high-biomass systems commercially available which could be incorporated into conventional aeration tanks. Two of such systems used highly reticulated sponges. One such system used a screen to keep the sponges in the aeration tank, and it was reported that among the problems that had to be solved were preventing blinding of the screen by using additional apparatus (an air-based system for returning the sponges to the influent volume of the tank).

In another of the systems reported on, the inert media was in the form of polyvinyl chlorodine (PVCE) strings having attached loops, with the strings wound around racks. The report noted that there was a persisting question as to the extent of stretching of the string, and additional structure such as a self-tensioning rack was said to address such stretching.

A final form of system studied in the EPA report used synthetic trickling filter media held on racks. It was noted plugging of this type of filter media has been of concern to certain individuals, and that an apparent way of negating this potential problem is to turn on an additional air blower periodically for short durations to slough off some of the fixed film biomass.

The study noted that additional throughput capacity realized by conversion to a high-biomass system could not be ascertained from the current data, but that it appeared that such conversion could at least double the biomass concentration and reduce by at least one-third the required return activated sludge pumping rate, as compared to a conventional activated sludge plant. The potential for increased throughput capacity was indicated, and there was a suggestion that high biomass systems may be more cost effective for plant upgrading than conventional approaches.

Another form of strings formed around racks is shown in U.S. Pat. No. 4,442,930 to Hatanaka, issued Dec. 27, 1983. Here, an elaborate frame system and rails provided at the top of a basin/pond are used to support upper and lower sections of movable rods. Long lengths of substrates are wound in a zig zag path around successive upper and lower ones of the rods. The rods are normally spaced across the length of a section of the frame, so that the zig zag substrates are in a large volume of the basin. The fixed zig zag path of the substrates avoids having freely floating loose ends of the substrates become entangled. The rods are spaced by bendable gap-retaining members which are held straight during operation of the system. To enable maintenance to be performed at the bottom of the basin, the gap-retaining members are bent to pull the rods to one side like a curtain and allow access to equipment below the substrates.

Although the frame, rails, and rods control the paths of the elongated substrates and avoid substrate tangling, the complexity of these heavy structural members significantly increases the installation cost. Further, the presence of the close-packed rods and substrates, and of the frame and rails, inherently makes it more difficult to access the entire bottom of the basin for maintenance.

In spite of these and other attempts to control the location of fixed-film submerged substrates, there is still a need for an inexpensive way to effectively position such substrates during liquid waste treatment while substantially reducing the interference of the substrates and their supports during maintenance.

SUMMARY OF THE INVENTION

Applicants have studied the problems and limitations of prior bacterial treatment systems in an endeavor to reduce the weight and initial cost thereof, and to further avoid interfering with maintenance operations which are necessary to assure efficient ongoing operations. Such studies indicate that it is not necessary to provide elaborate structure to retain lengths of fixed-film bacterial sites in zig zag, predetermined configurations simply to assure an ability to move such sites for maintenance. Further, the studies indicate that when such elaborate structures are eliminated, one can nonetheless provide ways of controlling the ends of elongated bacterial substrates against free floating and avoiding the risk of the substrates becoming tangled prior to or during maintenance operations.

The present invention contemplates use of aerator manifolds. Such manifolds are provided at spaced locations along the bottom of many existing aeration treatment facilities, such as basins or lagoons which contain biological waste to be treated. An elongated fixed-film substrate extends under such manifold at a particular axial location and defines a pair of normally-upwardly extending legs, one of which extends from each side of the manifold to a normally-upper substrate end. The substrate material may or may not be buoyant. A buoyant array piece is secured to each end of the substrate. Such pieces cause the legs of the substrate to straighten as the buoyant array pieces float on or are buoyantly urged toward the surface of the liquid waste. In this manner, one substrate assembly is formed by (1) one length of the elongated substrate material extending under the aerator manifold at such particular axial location along the manifold, and (2) one array piece attached to each of such ends of the substrate. Additional ones of such substrate assemblies may be provided at each such axial location, and/or additional ones such substrate assemblies may be provided at other axial locations along the length of the aerator manifold.

When the basin is drained for maintenance, the aerator manifold continues to supply gas and form bubbles which rise between the legs of each substrate, inducing upward flow of the liquid waste between such legs. During draining, the buoyant array pieces float on the surface of the liquid waste, allowing the legs to collapse as the pieces descend. Further, with each end of each substrate secured to one of the array pieces and each substrate extending around the aerator manifold, the bubbles and flow of waste urge the array pieces away from the manifold. In this manner, the array pieces carry the substrates away from the manifold as the waste is drained from the basin. As a result, when the waste has been completely drained from the basin the legs are generally resting on the bottom of the lagoon between the manifolds to facilitate easy maintenance. To the extent that a portion of a substrate leg may rest on a manifold, the array piece provides an easily identifiable way to remove such leg from the manifold.

It may be understood that the buoyant array pieces are inherently inexpensive, as are the elongated fixed-film substrates. Because the aerator manifold holds such pieces and substrates fixed against uncontrolled floating within the lagoon, and because such aerator manifolds in many cases exist in the lagoon, there is minimal additional structure required for processing the waste using the biological fixed-film sites.

The present invention also contemplates providing arrays of the substrate assemblies. In such arrays, the array pieces are organized relative to each other in subgroups on opposite sides of the manifold. Such subgroups may be in either of two forms. For example, the aerator manifold may be considered as extending along a "y" axis across the bottom of the basin, and an "x" axis may considered as being perpendicular to the y axis. The two forms of subgroups define x or y linear arrays. In the x linear arrays, the substrate assemblies are provided in a first subgroup aligned in a common vertical plane that extends parallel to the x axis. The lengths of the elongated legs of the substrates are selected to allow each of the array pieces of these substrate assemblies to float to its own area on the surface of the liquid waste along a line defined by the common vertical plane. A resulting first subgroup of adjacent array pieces is above and on one side of the manifold. A resulting second subgroup of adjacent array pieces is above and on the other side of the manifold. Each subgroup extends in the direction of the x axis.

In one embodiment of the present invention, each array piece of each subgroup is connected to the other array pieces that are oppositely adjacent in the direction of the x axis. The interconnected subgroup of array pieces extends in the direction of the x axis and as a unit is free to move in the direction of the y axis as the level of the liquid waste varies. There is at least one such interconnected subgroup on each side of the manifold.

In the y linear array, a subgroup of array pieces on one side of the manifold extends parallel to the y axis. In another embodiment of the present invention, each member of the subgroup is connected to other array pieces that are oppositely adjacent in the direction of the y axis. The interconnected subgroup of array pieces extends in the direction of the y axis and as a unit is free to move in the direction of the x axis as the level of the liquid waste varies. There is at least one such interconnected subgroup on each side of the manifold.

In a two dimensional form of array, the two above x linear array and y linear array are combined. The array pieces of the subgroups of such two dimensional array extend parallel to both the x axis and the y axis. In one embodiment of the two dimensional array, the array pieces are interconnected in the directions of both the x and y axes. As a result, on each side of the manifold there are interconnected subgroups of array pieces that form an array unit extending in the directions of both the x axis and the y axis. Each array unit on one side of the manifold is free to move in the direction of the x and y axes as the level of the liquid waste varies and the bubbles and the flow of waste urge the array units away from each other.

Such organization of the array pieces allows gas from the aerator and the induced flow of the waste to flow upwardly in a space between the opposite legs and the subgroups. The flowing gas and waste extend from the manifold to the upper surface of the liquid waste in the basin. The gas tends to dissolve in the waste to form gas-enriched liquid waste. When the legs of the substrate are hollow, for example, the upwardly flowing gas-enriched liquid waste reaches the upper surface of the waste, turns, flows horizontally and then downwardly in each leg of the substrate to bring the waste to the bacteria on the substrate. The downwardly flowing gas-enriched waste then flows horizontally through the substrate material to the space between the legs where the ongoing stream of bubbles from the manifold cause more of the waste to flow upwardly. Each upward and downward flow of the liquid waste is in cross-current relation to an incoming horizontal flow of the liquid waste (in the direction of the y axis), which promotes interaction of the inflowing waste with the substrates and the bacteria thereon.

With the subgroups of the array pieces interconnected in either of the linear arrays, or in both of these ways to form the two dimensional array, the movement of the ends of the substrate legs is controlled by inexpensive array pieces, such that when the basin is drained, the interconnected subgroups tend to settle between and not on the aerator manifolds and avoid interfering with maintenance of the basin.

It may be understood then that the present invention contemplates a method and apparatus for using aerator bubbles and a resulting flow of liquid waste to control the position of ends of elongated fixed-film sites both during operational and maintenance cycles.

The present invention also contemplates a method and apparatus for controlling the position of ends of elongated fixed-film sites both during operation and maintenance situations, wherein an array member is attached to each such end and responds to bubbles from an aerator to move the sites away from the aerator.

The present invention additionally contemplates a method and apparatus in which elongated fixed-film bacterial sites are placed under an aerator manifold and have ends extending upwardly therefrom into waste water to be treated, wherein such ends on one side of the manifold are held in array units and the positions of such array units during both waste treatment and maintenance operations are controlled in response to bubbles from the aerators to avoid tangling of the ends as the waste water is drained from the basin.

With these and other features of the present invention in mind, apparatus according to the present invention is provided for treating biological liquid waste. The waste flows through a container from an inlet to an outlet and is contacted by oxygenating gas in the presence of a high-surface-area structure which supports aerobic microorganisms. The container has a bottom and a manifold supported above the bottom to define a space above the bottom of the container. The manifold is defined as having a first side and a second side. The high-surface area structure is in the form of a one-piece elongated high-surface area mesh tube having a given length. The tube extends through the space with about a first half of the given length on the first side of the manifold to define a first leg having a first free end. About a second half of the given length of the tube is on the second side of the manifold to define a second leg and a second free end. First and second buoyant array members are provided, wherein the first of the array members is attached to the first free end and the second array member is attached to the second free end. The array members are effective to lift the respective ones of the legs to position the first and second ends of the tube at or near the surface of the waste.

In another aspect of the present invention, there is provided a method of controlling the positioning of a structure which supports aerobic microorganisms in a container for treating biological liquid waste. The waste has an upper surface, and the container has a bottom. The method includes a step of mounting a gas supply pipe in the container above the bottom to define a space between the bottom and the pipe. Two separate buoyant supports are provided in the container, each of the supports floating at or near the upper surface of the waste. The aerobic microorganism-supporting structure is provided in the form of an elongated porous tube which extends through the space to define first and second ends of the structure and a middle, wherein the middle of the structure is positioned under the pipe. Connecting each of the ends of the tube to one of the buoyant supports extends the tube and provides an elongated support for the microorganisms. Flowing gas from the pipe induces an upward flow of the waste above the pipe to urge the buoyant supports apart from each other and extend the ends of the tubes from the middle of the tubes. As the waste is drained from the container, the gas continues to flow and induce the upward flow of the waste, which keeps the buoyant supports apart to position the ends of the tubes away from the manifold pipe and allow maintenance operations to be performed on the pipe.

BRIEF DESCRIPTION OF THE DRAWINGS

Other features and advantages of the present invention will be apparent from an examination of the following detailed description, which include the attached drawings in which.

DETAILED DESCRIPTION OF THE PREFERRED EMBODIMENTS

Container 20 For Waste 21

Figure 1:
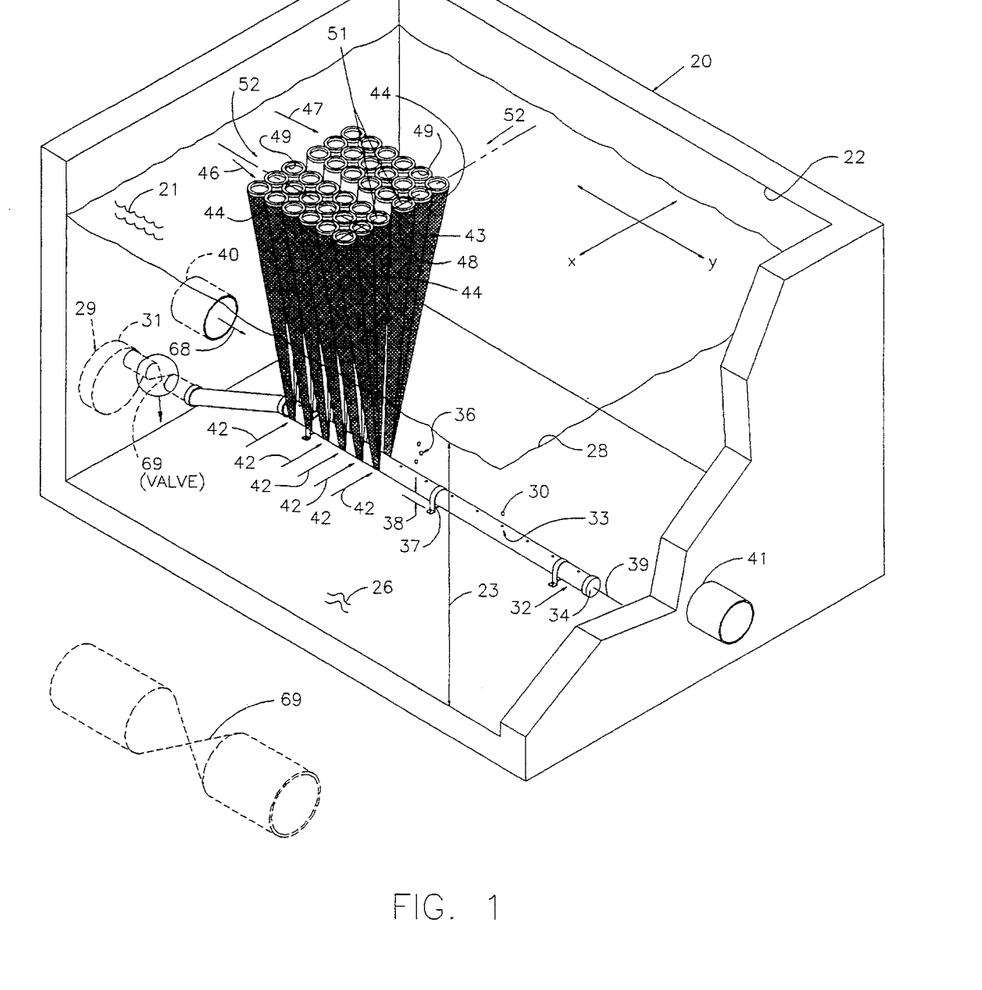
FIG. 1 is a three-dimensional view of a container which receives liquid waste to be treated by bacteria supported on fixed-film sites, wherein the sites are in the form of elongated tubes.
Figure 2:
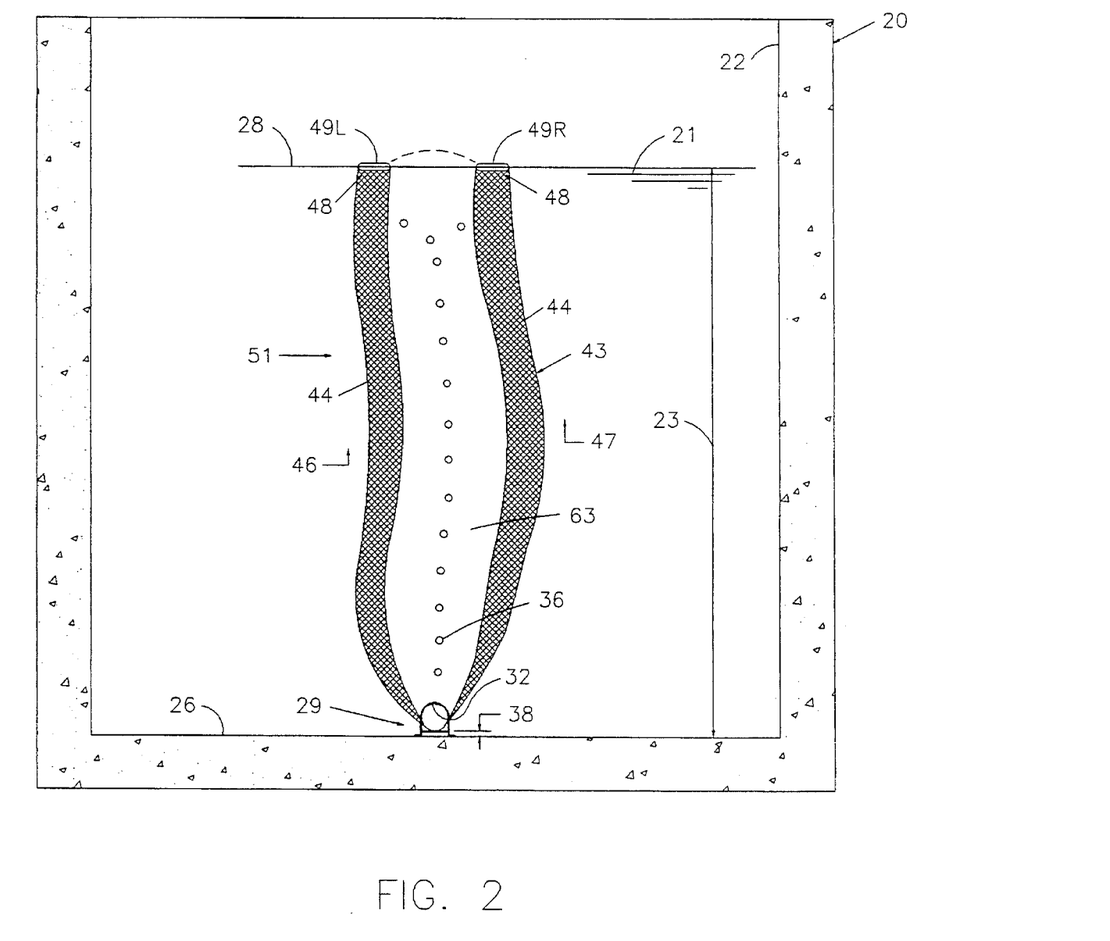
FIG. 2 is an elevational view showing the tubes extending under a gas manifold spaced from a bottom of the container to define two separate legs extending upwardly toward the surface of the waste.

Referring to FIGS. 1 and 2 of the drawings, a container 20 in which treatment of waste 21 occurs is shown as a basin 22. The container 20 may also be in the form of a naturally occurring lagoon or pond (not shown), or another man-made structure such as a tank (not shown). Whatever form of container 20 is used, the waste 21 is received in the container 20 so as to have depth 23 from a bottom 26 to an upper surface 28 sufficient for waste treatment to occur. Such depth 23 may, for example, be about fifteen feet. The waste 21 is shown in FIGS. 1 and 2 as being contained in the basin 20 and extending from the bottom 26 to the upper surface 28. The waste 21 is biological waste, which may be liquid, or waste suspended in liquid, and may include biodegradable materials. Such waste may be aqueous or an aqueous suspension, such as biological waste from domestic sources. Such biological waste is referred to herein as "waste" or "liquid waste".

Aerator System 29 For Waste 21

Figure 3:
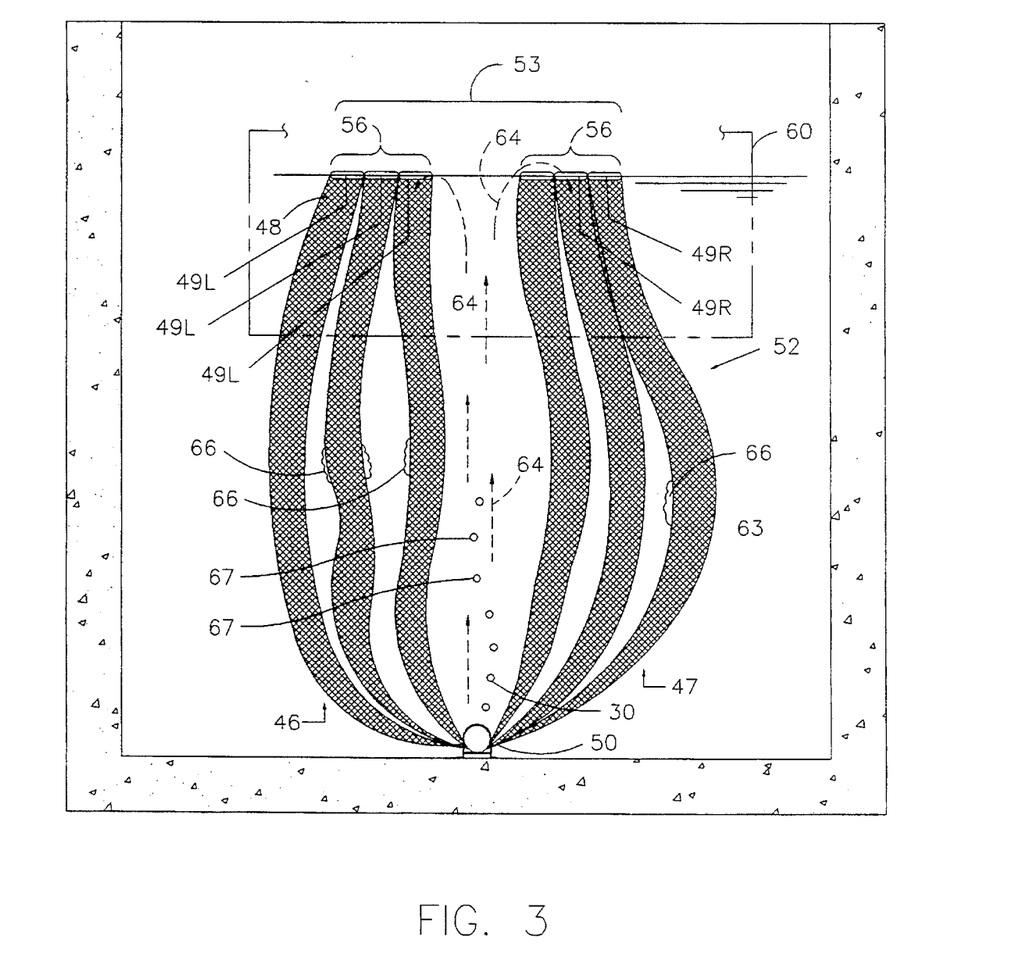
FIG. 3 is a view similar to FIG. 2, wherein a plurality of tubes are shown extending under the manifold pipe.

Whichever type of container 20 is used, an aerator system 29 for supplying gas 30 to the waste 21 is provided in the container 20. The system 29 shown in the FIGs. includes a pump or other gas supply device 31 which terminates in a conduit 32 which is received in the basin 20. The conduit 32 may be a pipe (referred to as a manifold) having facilities such as holes or other gas diffusers for the allowing the gas 30, such as air, to be admitted into the basin 20. The gas-admitting facilities 33 are shown as a series of apertures which extend through a wall 34 of the pipe 32. However, other such gas-admitting facilities 33 may be used, such as porous ceramic domes or hollow rubber disks having slits (not shown), which also admit fine streams 36 of the gas 30 into the basin 20. As shown in FIGS. 1–3, the pipe 32 is supported by straps 37 above the bottom 26 of the basin 20 so that there is a space 38 under the pipe 32. Maintenance of these types of gas diffusers 33 is required because the fine holes which admit the gas 30 to the basin 20 can become clogged and require cleaning.

For purposes of describing the present invention, an orthogonal axis system is shown including an x axis and a y axis, wherein the y axis extends in the direction of a longitudinal axis 39 of the pipe 32. The x axis extends perpendicular to the y axis and perpendicular to the direction of flow of the waste 21, which flow is in the direction of the y axis from an inlet 40 to an outlet 41 of the basin 20. Locations spaced axially along the length of the pipe in the direction of the y axis are denoted by arrows 42 in FIG. 1.

Substrate Assemblies 51

Referring to FIG. 2, the present invention combines the aerator manifolds 32 with one or more elongated fixed-film substrates 43 which extend under one of the manifolds 32 to define a pair of normally-upwardly extending legs 44. One of the legs 44 extends from each side (from a left side 46 or a right side 47 as shown in FIG. 2) of the manifold 32 to a normally-upper substrate end 48. A buoyant array piece 49 is secured to each end 48 of the substrate 43, and causes the legs 44 of the substrate 43 to straighten as the buoyant array pieces 49 float on or are buoyantly urged toward the surface 28 of the liquid waste 21. In this manner, the legs 44 extend upwardly from a middle 50. One substrate assembly 51 is formed by one length of the elongated substrate 43 extending under the aerator manifold 33 at a particular one of the axial locations 42 along the manifold 33, and by two array pieces 49, one attached to each of such ends 48 of the substrate 43.

Arrays 52 of Substrate Assemblies 51

As shown in FIG. 1, additional ones of such substrate assemblies 51 may be provided at each such axial location 42 along the length of the manifold 32. As shown in both FIGS. 1 and 3, in addition to or as an alternate to providing such substrate assemblies 51 at such axial spacing, a plurality of substrate assemblies 51 may be provided at the same axial location 42. In each case, arrays 52 of such substrate assemblies 51 may be formed by various arrangements of multiple ones of the substrate assemblies 51.

In such arrays 52, the buoyant array pieces 49 of the multiple substrate assemblies 51 are referred to as a group 53 which extends from one side 46 of the manifold 32 to the other side 47 of the manifold 32. Each such group 53 includes two subgroups 56, wherein one subgroup 56 is on one side 46 of the manifold 32 and the other subgroup 56 is on the other side 47 of the manifold 32. The subgroups 54 of the buoyant array pieces 49 may be organized and combined relative to each other in selected ways to form or define either an x linear array 57 (FIG. 7) or a y linear array 58 (FIG.8) or a two dimensional array 59 (FIG. 9), for example.

X Linear Array 57

Figure 7:
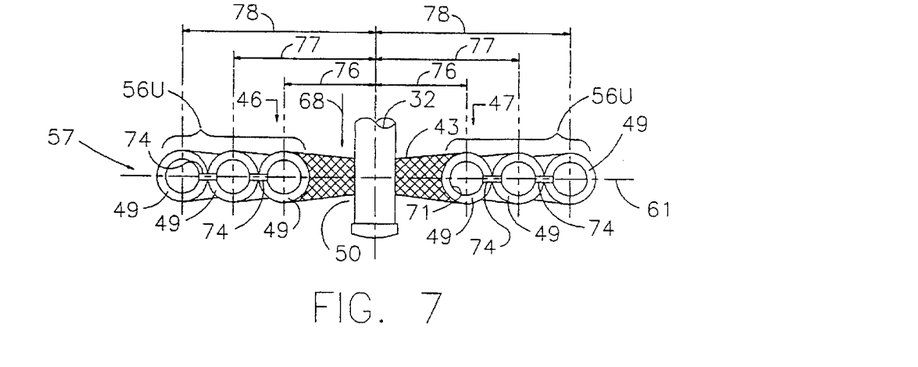
FIG. 7 is an enlarged plan view similar to FIG. 4, wherein the manifold is shown extending in the direction of a "y" axis, and one array of buoyant members is shown extending in the direction of an "x" axis, with subgroups of the members of such array being connected to each other to form an "x" linear array.

In the x linear arrays 57, the substrate assemblies 51 are provided in a first of the subgroups 56L aligned in a common vertical plane 60 that extends parallel to the x axis. The lengths of the elongated legs 44 of the substrates 43 are selected to allow each of the array pieces 49 of these substrate assemblies 51 to float to its own area on the surface 28 of the liquid waste 21 generally along a line 61 defined by the common vertical plane 60. The adjacent array pieces 49L of the first (or left) subgroup 56L are above and on the one (left) side 46 of the manifold 32. The adjacent array pieces 49R of a second subgroup 56R are above and on the other (right) side 47 of the manifold 32, with each such subgroup 56L and 56R extending generally along the line 61 in the direction of the x axis.

Interconnected X Linear Array Units 56U

In one embodiment of the present invention, each buoyant array piece 49 of the subgroup 56L or 56R is connected to one or more of the array pieces 49 that are oppositely adjacent in the direction of the x axis. Each of the interconnected subgroups 56L or 56R of array pieces 49 extends in the direction of the x axis and as a unit, referred to as a unit 56UL or 56UR, is free to move in the direction of the y axis as the level of the liquid waste 21 varies. There is at least one such interconnected unit or subgroup 56UL and one such unit or subgroup 56UR on each respective side 46 or 47 of the manifold 32.

Y Linear Array 58

Figure 8:
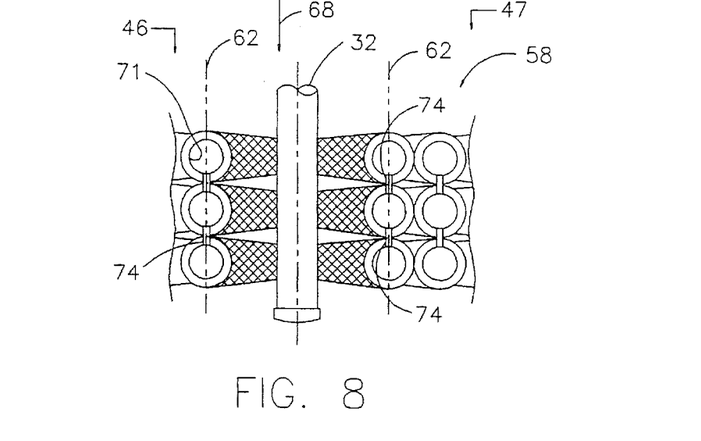
FIG. 8 is an enlarged plan view similar to FIG. 7, wherein the manifold is shown extending in the direction of the "y" axis, and a different array of buoyant members is shown provided in the direction of the y axis, with subgroups of the members on each side of the manifold being connected to each other to form a "y" linear array.

In the y linear arrays 58, a subgroup 56 of the array pieces 49 is on each side 46 or 47 of the manifold 32 and extends along a line 62 parallel to the y axis. The array pieces 49 of the subgroup 56 are adjacent to each other. Except for the direction in which the array pieces 49 extend, the x linear array 57 is the same as the y linear array 58.

Interconnected Y Linear Array Units 56U

Each buoyant array piece 49 of the y linear array subgroup 56L or 56R is connected to one or more of the array pieces 49 that are oppositely adjacent in the direction of the y axis. Each interconnected subgroup 56 of the array pieces 49 is referred to as a unit 56U which extends in the direction of the y axis. The unit 56U is free to move in the direction of the x axis as the level of the liquid waste 21 varies. There is at least one such unit 56U on each side 46 and 47 of the manifold 32.

Two Dimensional Array 59

Figure 9:
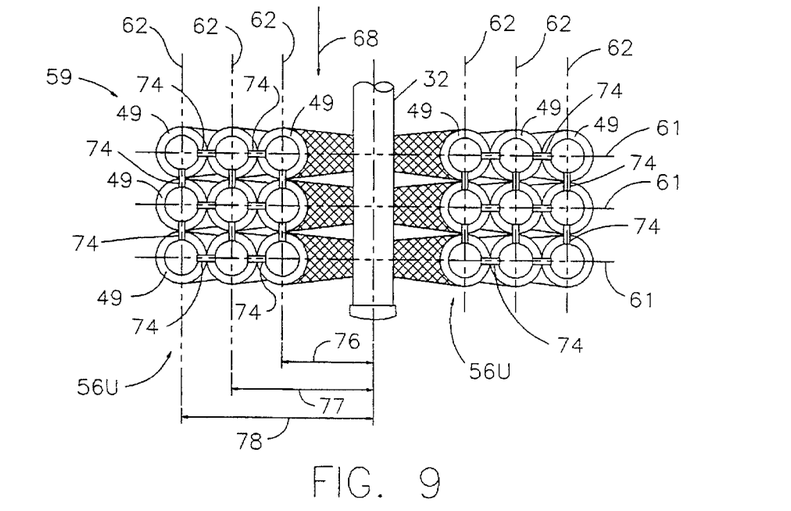
FIG. 9 is an enlarged plan view similar to FIGS. 7 and 8, wherein the manifold is shown provided in the direction of the "y" axis, and subgroups of the buoyant array members are shown provided on each side of the manifold and in the direction of both the x and y axes, with the subgroup members being interconnected to each other to form a two dimensional array.

In the two dimensional form of the array 52, the two above x linear array 57 and y linear array 58 are combined. Thus, a two dimensional array 59 is formed from array pieces 49 of the subgroups 56 that are defined as extending parallel to the x axis and from the array pieces 49 of the subgroups 56 of such array pieces 49 that are defined as extending parallel to the y axis. Each subgroup 56L and 56R is thus in two dimensions.

Interconnected Units 56U of Two Dimensional Array 59

In one embodiment of the present invention, the array pieces 49 of each two dimensional subgroup 56 are connected in the directions of both the x and y axes. As a result, on each side 46 and 47 of the manifold 32 there are interconnected subgroups 56, or units 56U, of the array pieces 49. Together, such units 56U form the two dimensional array 52, with the array pieces 49 of each unit 56U extending in the directions of both the x axis and the y axis. Each unit 56U on one side 46 of the manifold 32 is free to move in the direction of the x and y axes as the level of the liquid waste 21 varies.

Cooperation of Subgroups 56/Units 56U and Gas 30

Such organization of the array pieces 49 allows the gas 30 from the aerator system 29 to flow upwardly in a space 63 between the opposite legs 44 and the opposite subgroups 56 (or units 56U). The flowing gas 30 induces a flow (see arrows 64) of the waste 21. The flow 64 extends from the manifold 32 to the upper surface 28 of the liquid waste 21 in the basin 20. The gas 30 tends to dissolve in the waste 21 to form gas-enriched liquid waste. When the legs 44 of the substrate 43 are hollow, for example, the upwardly flowing gas-enriched liquid waste 21 reaches the upper surface 28 of the waste 21, turns, flows horizontally and then downwardly in each leg 44 of the substrate 43 to bring the waste 21 to bacteria 66 on the substrate 43. The downwardly flowing gas-enriched waste 21 then flows horizontally through the open-mesh material of the substrate 43 into the space 63 between the legs 44 where an ongoing stream 36 of bubbles 67 from the manifold 32 causes more of the waste 21 to flow upwardly. Each upward and downward flow 64 of the liquid waste 21 is in cross-current relation to an incoming horizontal flow 68 of the liquid waste 21. The incoming flow 68 is in the direction of the y axis. The cross current relation promotes interaction of the inflowing waste 21 with the substrates 43 and the bacteria 66 thereon, with the growth of the bacteria 66 being supported by the gas 30 brought by the flow 64.

Figure 10:
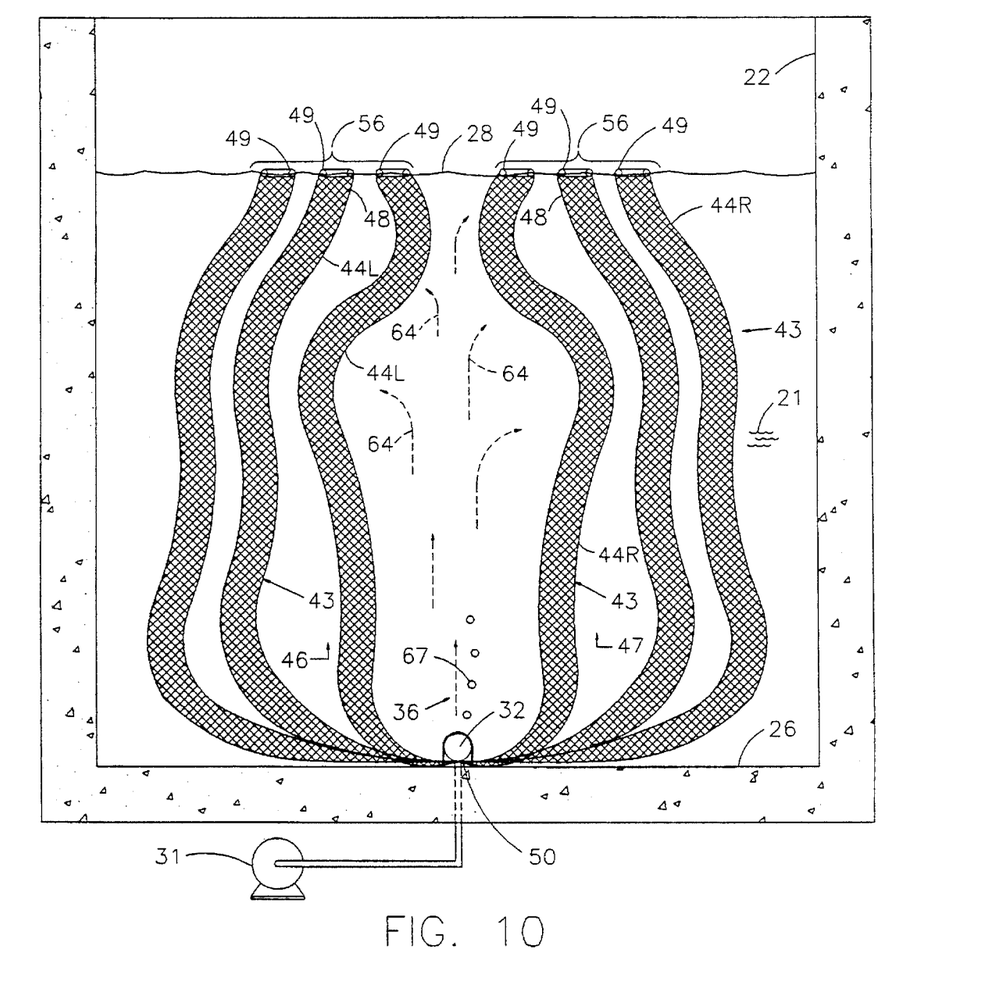
FIG. 10 is an end view of the manifold pipe and the tubes extending thereunder, showing the waste being drained from the container and the air bubbles urging the array pieces of one array unit on one side of the manifold away from the array pieces of an opposite array unit on the other side of the manifold.

With the subgroups 56 of the array pieces 49 in either of the linear arrays 57 or 58, respectively, or in both of these ways to form the two dimensional array 59, the movement of the ends 48 of the substrate legs 44 is controlled by the inexpensive array pieces 49. Such control is enhanced when the array pieces 49 of the subgroups 56 are interconnected to form the units 56U. In either embodiment, when the basin 20 is drained for maintenance, a controller 69, such as a valve, is set so that the aerator manifold 32 continues to supply the gas 30 and to form the bubbles 67 which rise between the legs 44 of each substrate 43, inducing the upward flow 64 of the liquid waste 21 between the legs 44 of the substrate 43. The bubbles 67 and the flow 64 act on the array pieces 49, whether unconnected or in the units 56U, by urging them apart so that the left array pieces 49L move to the left side 46 of the manifold 32 and the right array pieces 49R move to the right side 47 of the manifold 32. Also, during draining of the waste 21 from the basin 20, the buoyant array pieces 49 float on the surface 28 of the waste 21, allowing the legs 44 to collapse as the array pieces 49 descend (FIG. 10). With each end 48 of each substrate 43 secured to one of the array pieces 49 and each substrate 43 having a middle 50 extending around the aerator manifold 32, the bubbles 67 and the upward flow 64 of the waste 21 urge the array pieces 49 away from the manifold 32. In this manner, the array pieces 49 carry the legs 44 of the substrates 43 away from the manifold 32 as the liquid waste 21 is drained from the basin 20, so that when the liquid waste 21 has been emptied from the basin 20 the legs 44 are generally resting on the bottom 26 between the manifolds 32 to facilitate easy maintenance. To the extent that a portion of a substrate leg 44 may rest on a manifold 32, the array piece 49 provides an easily identifiable way to remove such leg 44 from the manifold 32.

Method of Controlling Position Of Substrates 43 In Basin 20

The present invention provides a method for controlling the position of the substrates 43, and in particular, the position of the ends 48 of the elongated fixed-film sites which are provided in the form of the substrates 43. Such controlling is both during operational and maintenance cycles and uses the aerator bubbles 67 and the resulting flow 64 of waste liquid 21. Referring to FIGS. 1 and 3, the method includes the steps of attaching one of the array members 49 to each end 48 of each of the elongated substrates 43. Such substrates 43 are placed under the aerator manifold 32 with the middle 50 of the substrate 43 under the manifold pipe 32 and the ends 48 of the tubular substrate 43 extending upwardly from the middle 50 into the waste water 21 to be treated. A next step of flowing the gas 30 from the pipe 32 supplies the gas 30, such as air, to flow along the open mesh tube or substrate 43 and over the bacteria 66 thereon to support an aerobic process in which the bacteria 66 feed on the nutrients in the waste 21. The upward stream 36 of the gas 30 induces the upward flow 64 of the waste 21 above the pipe 32 within the space 63 between the legs 44 of the tubular substrate 43. The upward flow 64 of the waste 21 is in the form of a rolling upward surge of the waste 21 that turns outwardly (in the direction of the x axis) as it approaches and reaches the surface 28 of the waste 21. The outwardly surging flow 64 urges the buoyant support piece 49 attached to one end 48 of the tubular substrate 49 apart from the buoyant support 49 attached to the other end 49 of the substrate 43 and extends the ends 48 of the tubular substrates 49 from the middle 50 of the substrates 49.

As additional steps of one embodiment of the method, many substrates 49 may be placed under the pipe 32 at the same axial location (arrow 42 in FIG. 4) along the pipe 32, or may be placed at axially spaced locations 42. These tubular substrates 43 are provided with the array pieces 49 as shown in FIG. 3.

As additional steps of another embodiment of the present invention, the many array pieces 49 are then selectively connected to form the x linear array 57, or the y linear array 58 or the two dimensional array 59. Additionally, the array pieces 49 of such arrays 52 are selectively interconnected to form the units 56U.

As shown in FIG. 10, in another embodiment of the present invention, the inlet 40 of the basin 20 may be closed and the outlet 41 kept open to facilitate draining of the waste 21 from the container 20. The step of flowing the gas 30 continues, and continues to induce the upward and outward flow 64 of the waste 21, which keeps the buoyant support pieces 49 in the subgroups 56 or the units 56U apart to position the ends 48 of the tubular substrates 43 away from the manifold 32. The buoyant pieces 49 tend to move in vertical paths as the waste 21 is drained from the basin 20.

Upon completion of the draining of the basin 20, the flowing step has resulted in positioning the ends 48 of the substrates 43 away from the manifold 32 to allow maintenance personnel to have direct access to the manifold 32. If events such as strong waste currents cause the array pieces 49 or the substrates 43 to rest on the manifold 32 at the end of the draining operation, the personnel can simply grasp the array pieces 49 and thereby easily move the substrates 43.

Detailed Description Of Substrate Assemblies 51

The substrates 43 are formed of open-mesh fabric which is tubular in configuration. The fabric may be inert and resistive to ultraviolet radiation. In one embodiment of the present invention, the fabric may be non-woven polyethylene fibre having the following features. The fibers may be about 0.003 inches in diameter and formed to define open-mesh diamond shapes having inner openings of about ¼ inch by ¼ inch. When such tubular fabric is flattened, the distance across the fabric is about fourteen inches. When the fabric is in the form of a tube, such tube has about a nine inch diameter. The fabric may be about thirty feet long, so that when the fabric is placed under the manifold 32, each of the legs 44 extends about fifteen feet upwardly from the manifold 32. The fabric supports the bacteria 66, and such openings of the open-mesh thereof are sufficiently large as to allow the waste 21 to flow therethrough even when the fabric surfaces are covered with the bacteria 66.

The buoyant array pieces 49 are in the form of buoyant members which can be efficiently secured to the ends 48 of the tubular substrates 43. The configuration of the array pieces 49 may be annular having an eight inch outer annulus diameter and a one inch diameter of the tube which forms the annulus, leaving a six inch opening 71 in the center of the annulus, for example. Such pieces 49 may be fabricated from a foam-like polyethylene material which provides a lift of about 0.6 pounds when floating in the liquid waste 21. The amount of lift provided by each array piece 49 is selected so that the combined lift of all of the array pieces 49, net of the weight of the substrates 43 connected to the array pieces 49, is just more than neutral.

Figure 5:
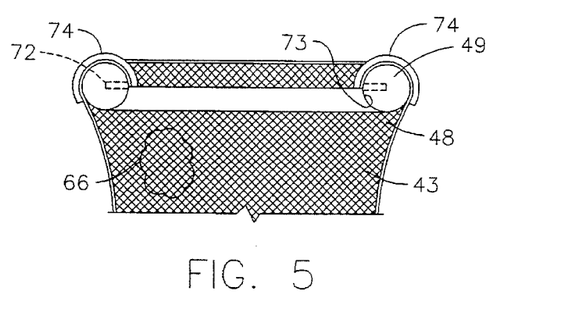
FIG. 5 is a cross-sectional view taken along lines 5—5 in FIG. 4 showing one of the array members with an end of one of the tubes connected thereto.
Figure 6:
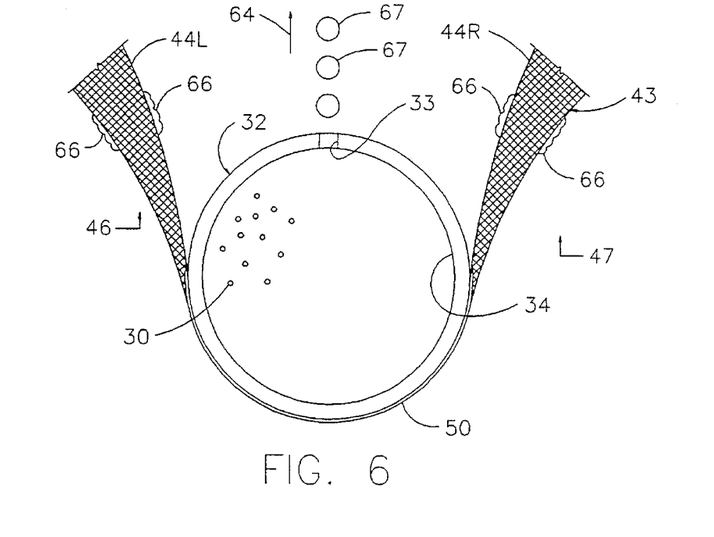
FIG. 6 is a cross-sectional view taken along lines 6—6 in FIG. 4, illustrating a tube extending under the manifold pipe.

The inner surface of the opening 71 of the annular array pieces 49 is provided with a slit 72 to facilitate securing the tubular substrates 43 to the annular array pieces 49. Each of the ends 48 of each tubular substrate 43 is extended around the outside of one of the annular array pieces 43 and is pulled into the inner opening 71 of the annular array piece 49 in an invagination operation (FIG. 5). The end 48 of the tubular substrate 43 is forced into the slit 72 and a bonding adhesive 76 is forced into the slit 72 to secure the tubular substrate 43 to the annular array piece 49. A clip 74 may also be snapped over the annular array piece 49 to further secure the substrate 43 to and over the outside of the annular array pieces 43.

In the x linear array 57 shown in FIG. 7, the buoyancy of innermost first and second array pieces (shown as the pieces 49A and 49B in FIG. 3) enables these pieces 49 to position the respective ends 48 of the tubular substrates 43 at a first selected distance 76 from the respective first and second sides 46 and 47 of the pipe 32. The second one of the tubular substrates 43 extends through the space 63 at the same selected axial position (see arrow 42) along the length of the manifold 32. The second tubular substrate 43 is positioned with about a first half of its length on the first side 46 of the pipe 32 to define a third one of the legs 44 and a third free end 48 and about a second half of the length of the second tubular substrate 43 extends on the second side 47 of the pipe 32 to define a fourth one of the legs 44 and a fourth free end 48. A third array piece 49 is attached to the third free end 48, and a fourth array piece 49 is attached to the fourth free end 48. The third and fourth array pieces 49 are effective to lift each of the respective third and fourth legs 44 to position the respective third and fourth ends 48 of the second tubular substrate 43 at or near the surface 28 of the waste 21. The third and fourth array pieces 49 are positioned relative to the respective sides 46 and 47 of the pipe 32 by distances 77 that are greater than the first selected distance 76 at which the respective first and second legs 44 are positioned relative to the respective first and second sides 46 and 47. A distance 78 is shown for the spacing of the outer array pieces 49 from the sides 46 and 47.

For the two dimensional array 59, FIG. 9 shows such distances 76 and 77, with a distance 78 at which outer ones of the array pieces 49 are spaced from the sides 46 or 47.

Figure 4:
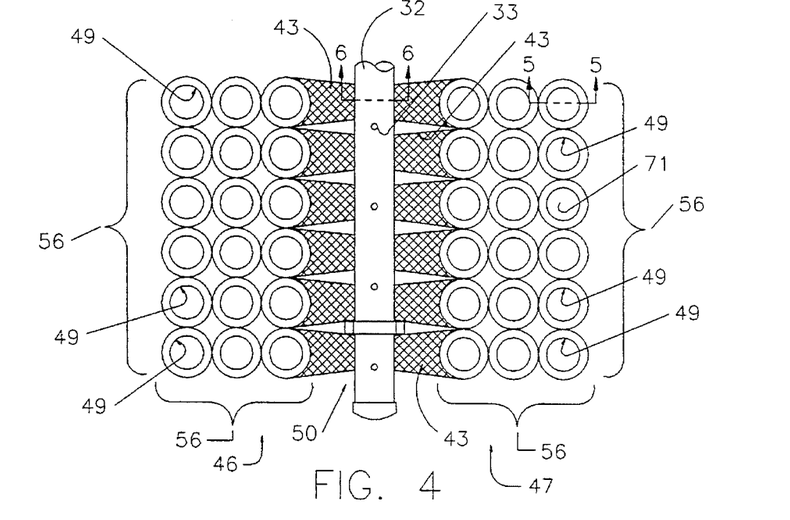
FIG. 4 is a plan view of the tubes shown in FIG. 3, wherein an end of each tube is secured to a buoyant array member, and the buoyant array members are connected in an array.

As shown in FIGS. 4 and 7, when multiple ones of the array pieces 49 are used with multiple tubular substrates 43 at a given axial position 42, the first and third array pieces 49L are positioned offset in the direction of the x axis from the first or left side of the pipe 46. In a similar manner, the second and fourth array pieces 49 are positioned offset in the direction of the x axis from the second or right side 47 of the pipe 42. The array pieces 49 are held by the clips 74 in the x linear array 57 or the y linear array 58 or in the two dimensional array 59.

While the preferred embodiments of the invention have been described in order to illustrate the basic relationships of the present invention, numerous variations of the present invention may be made without departing from the present teachings and concepts. Therefore, the form of the present invention described above is illustrative, and the scope of the present invention should not be anything less than that described in the following claims.

What is claimed is:

1. In an apparatus for treating liquid waste containing a biodegradable waste product, wherein the waste flows through a container from an inlet to an outlet and is contacted by oxygenating gas in the presence of a high-surface-area structure which supports aerobic microorganisms, said container having a bottom and a pipe supported above said bottom to define a space above said bottom of said container, said pipe having a first side and a second side, said waste being contained in said container and having an upper surface, the improvement comprising:

said high-surface area structure being a one-piece elongated high-surface area mesh tube having a given length, said tube extending through said space and being positioned with about a first half of said length on said first side of said pipe to define a first leg and a first free end and about a second half of said length of said tube on said second side of said pipe to define a second leg and a second free end; and first and second buoyant array members, each of said members having a surface defining an opening, said surface of said first of said array members being attached to said first free end and said surface of said second array member being attached to said second free end;

said first and second free ends being kept open by said respective surfaces of said first and second buoyant array members to define said tube;

said respective ones of said legs attached to said buoyant array members with said first and second ends of said tube at or near the surface of the waste.

2. In apparatus according to claim 1, the improvement further comprising:

said pipe being provided with apertures through which said oxygenating gas is supplied to said container between said legs of said tube.

3. In apparatus according to claim 2, the improvement further comprising:

said inlet being closable.

4. In apparatus according to claim 1, wherein said pipe has a length extending between said inlet and said outlet, the improvement further comprising:

said tube extending through said space at a selected position along said length of said pipe;

said respective ends of said tubes being at a selected distance from said respective first and second sides of said pipe;

a second one of said tubes extending through said space at said selected position along said length of said pipe, said second tube being positioned with about a first half of said length on said first side of said pipe to define a third leg and a third free end and about a second half of said length of said second tube on said second side of said pipe to define a fourth leg and a fourth free end; and third and fourth buoyant array members, each of said third and fourth members having a surface defining an opening, said third array member being attached to said third free end, said fourth array member being attached to said fourth free end;

Said third and fourth free ends being kept open by said respective surfaces of said third and fourth buoyant array members to define said second tube;

said third and fourth ends of said second tube being at or near the surface of the waste and positioned relative to said respective sides of said pipe by a given distance that is greater than said selected distance at which said respective first and second legs are positioned relative to said respective first and second sides.

5. In apparatus according to claim 4, the improvement further comprising:

said first and third array members being positioned offset from said first side of said pipe;

a first retainer connected to said first and third buoyant members to form a first buoyant array offset from said first side of said pipe, said second and fourth array members being positioned offset from said second side of said pipe; and a second retainer connected to said second and fourth buoyant members to form a second buoyant array offset from said second side of said pipe.

6. In an apparatus for treating liquid waste containing a biodegradable waste product, wherein the waste product is biologically digested as the waste flows through a container from an inlet to an outlet, said waste flow including waste flowing toward said bottom of said container; the biological digestion being done by contacting the waste with oxygenating gas in the presence of a porous structure which supports aerobic microorganisms, said container having a bottom and a manifold supported on said bottom to provide a given vertical clearance between said bottom and said manifold, a first side of said manifold being near said inlet and a second side of said manifold being near said outlet, the improvement comprising:

said porous structure being a one-piece elongated porous mesh tube extending through said vertical clearance, said tube having a middle contacting said manifold and a first leg connected to said middle and extending away from said manifold on said one side of said manifold to define a first leg and a first free end, and said tube having a second leg connected to said middle and extending away from said manifold on said second side of said manifold to define a second leg and a second free end;

a first buoyant member connected to said first free end, said first buoyant member having an opening therein;

said first free end being kept open by said first buoyant member to receive said waste flowing toward said bottom; and a second buoyant member connected to said second free end;

said second buoyant member having an opening therein;

said second free end being kept open by said first buoyant member to receive said waste flowing toward said bottom.

7. In apparatus according to claim 6, wherein the waste has a surface above said manifold, the further improvement comprising:

said first and second buoyant members tending to rise in said container toward the surface of said waste;

said respective first and second free ends of said respective first and second legs moving with said respective connected first and second buoyant members from said middle into a position toward the surface of the waste to receive said waste flowing toward said bottom.

8. In an apparatus according to claim 7, wherein said manifold supplies the gas to the container in the form of bubbles which rise in the container and induce an upward flow of the waste in the container, the outlet of the container being adapted to drain the waste from the container, the improvement further comprising:

said first and second buoyant members being urged by said upward flow of the waste away from each other; and a gas flow controller for said manifold, said controller having an on control in which the gas flows to said manifold when said outlet drains the waste from said container;

said manifold continuing to supply the gas to the container as the waste is drained from the container so that the bubbles continue to induce said upward flow and said flow urges said first and second buoyant members away from each other and from said manifold until the level of the waste in the container is about the level of said manifold.

9. In an apparatus according to claim 8, the improvement further comprising:

said manifold having a length in a direction extending between the inlet and the outlet;

a plurality of said porous mesh tubes, each of said tubes extending through the clearance, each of said tubes having a middle contacting the manifold pipe and a first leg connected to said middle and extending away from the manifold on said one side of said manifold to define said first leg and said first free end, and each said tube having a second leg connected to said middle and extending away from said manifold on said second side of said manifold to define said second leg and said second free end;

a plurality of said first buoyant members, one of said first buoyant members being connected to each of said first free ends; and a plurality of said second buoyant members, one of said second buoyant members connected to each of said second free ends.

10. In apparatus according to claim 9, the further improvement comprising:

each of said first buoyant members on said first side of the manifold being adjacent to another of said first buoyant members;

each of said second buoyant members on said second side of the manifold being adjacent to another of said second buoyant members;

connectors secured to said adjacent buoyant members on said first side of the manifold to hold said members in a two dimensional array at or near the surface of the waste at said first side of the manifold;

connectors secured to said adjacent buoyant members on said second side of the manifold to hold said members in a two dimensional array at or near the surface of the waste at said second side of the manifold; and said connected buoyant members on said first side being urged by said upward flow away from said connected buoyant members on said second side;

said respective legs having said first free ends connected to said respective buoyant members moving when said buoyant members are so urged, and moving horizontally away from said manifold to form an elongated two dimensional array of said tubes having a common axis along said manifold.

11. Apparatus for treating liquid waste containing a biodegradable waste product, wherein the waste product is biologically digested as the waste flows through a container in the direction of a first axis of the container, the container having a second axis perpendicular to the first axis, the biological digestion being done by contacting the waste with oxygenating gas in the presence of aerobic microorganisms, said container having a bottom, said apparatus comprising:

a manifold supported on and spaced above said bottom by a given vertical clearance, said manifold extending parallel to said first axis and having apertures spaced therealong linearly at a plurality of bubble supply locations, said manifold having a first side and a second side opposite to said first side;

a gas supply system connected to said manifold to supply said gas through said apertures into said container along a two dimensional bubble plane extending upwardly in said container from said apertures;

a plurality of one-piece, elongated porous mesh tubes extending through said clearance at a given one of said bubble supply locations, each of said tubes having a central section underneath said bubble supply location of said manifold, each of said tubes having a first leg connected to said central section and extending away from said manifold upwardly from said first side of said manifold, said first leg extending to a first free end, each of said tubes having a second leg connected to said central section and extending away from said manifold upwardly from said second side of said manifold, said second leg extending to a second free end, said tubes being adapted to support said microorganisms;

a first series of buoyant members interconnected in a first linear array extending parallel to said second axis above said manifold, each one of said first free ends of said tubes being connected to a different one of said buoyant members of said first series of buoyant members; and a second series of buoyant members interconnected in a second linear array extending parallel to said second axis and above said manifold, each one of said second free ends of said tubes being connected to a different one of said buoyant members of said second series of buoyant members.

12. Apparatus according to claim 11, further comprising:

said first legs hanging from said first series of buoyant members and said second legs hanging from said second series of buoyant members, said hanging first and second legs hanging in a microorganism plane perpendicular to said bubble plane; and said container being provided with an inlet and an outlet spaced along said second axis to establish a flow of said waste parallel to said second axis through said hanging first and second legs and across the bubble plane.

13. Apparatus according to claim 12, wherein said bubbles in said bubble plane being effective to induce flow of said waste upwardly along said bubble plane, said induced upward flow branching and flowing toward each of said sides of said manifold and downwardly into said first free ends at said first side of said manifold and into said second free ends at said second side of said manifold for contact with the supported microorganisms; further comprising:

each of said linear arrays and said free ends connected thereto being positioned adjacent to said upward induced flow and urged by said induced flow away from each other in the direction of said second axis so that upon draining of said waste from said outlet of said container each of said linear arrays and its respective free ends of said tubes is positioned above a respective one of said first and second sides of said manifold offset from to said first axis and said bubble plane, said offset linear arrays and free ends settling on said bottom at said respective sides of said manifold as said draining is completed.

14. A method of controlling the positioning of a structure which supports aerobic microorganisms in a container for treating liquid waste, said waste including a biodegradable waste product and having an upper surface, said container having a bottom, said method comprising the steps of:

mounting a gas supply pipe in said container above said bottom to define a space between said bottom and said pipe;

providing two separate buoyant supports in said container, each of said supports floating at or near the upper surface of said waste;

providing said structure in the form of an elongated porous tube which extends through said space to define first and second ends of said structure and a middle of said structure positioned under said pipe;

connecting each of said ends of said tube one of said buoyant supports to extend said tube and provide an elongated support for said microorganisms; and flowing gas from said pipe to induce an upward flow of said waste above said pipe, said upward flow maintaining each of said buoyant supports apart from the other of said tubes to extend said tubes from said middle.

15. A method of controlling the positioning of said structure according to claim 14, further comprising the steps of:

draining said waste from said container, said draining removing a first quantity of said waste from said container while a second quantity of said waste remains in said container prior to being drained from said container; and while said draining occurs, continuing to flow said gas from said pipe so that said upward flow is continued in said second quantity of waste, said upward flow continuing to maintain each of said buoyant supports apart from the other of said buoyant supports so that as said second quantity of said waste drains from said container said ends of said support and said buoyant supports are positioned at opposite sides of said pipe to allow clear access to said pipe once substantially all of said waste has been drained from said container.

16. The method according to claim 14, wherein a plurality of said structures support the aerobic microorganisms in the container, the method further comprising the steps of:

providing additional even numbers of separate buoyant supports and one additional one of said tubes for each two additional two separate buoyant supports;

performing said connecting step with respect to said additional tubes and two additional separate buoyant supports;

allowing said buoyant supports connected to said ends of said tubes to float at or near said surface in a first group on one side of said pipe and to float in a second group on an opposite side of said pipe;

interconnecting said buoyant supports of one of said groups to define a first array of said buoyant supports on said one side; and interconnecting said buoyant supports of the other of said groups to define a second array of said buoyant supports on said opposite side;

said upward flow of said waste maintaining each of said buoyant supports in said first array apart from the other of said buoyant supports in said second array to extend said tubes from said middle.

17. The method according to claim 16, further comprising the steps of:

draining said waste from said container, said draining removing a first quantity of said waste from said container while a second quantity of said waste remains in said container prior to being drained from said container; and while said draining occurs, continuing to flow said gas from said pipe so that said upward flow is continued in said second quantity of waste, said upward flow continuing to maintain each of said buoyant supports of said first array apart from said buoyant supports of said second array so that as said second quantity of said waste drains from said container said ends of each of said tubes and said buoyant supports of said first array connected thereto are positioned on an opposite side of said pipe from said ends of each of said tubes and said buoyant supports of said second array connected thereto to allow clear access to said pipe once substantially all of said waste has been drained from said container.

18. A method according to claim 16, wherein said pipe extends along a first axis, said method comprising the further steps of:

providing additional ones of said tubes and said separate buoyant supports both at the same axial position along said first axis and at axially spaced positions along said first axis;

said separate buoyant supports on one side of said pipe being connected in one of said arrays and said separate buoyant supports on the opposite side of said pipe being connected in another of said arrays;

said flowing step inducing said upward flow to maintain all of said arrays on said one side of said pipe apart from all of said arrays on said opposite side of said pipe.

19. A method of controlling the positioning of an open mesh tube which supports aerobic microorganisms in a container for treating liquid waste, said waste including a biodegradable waste product and having an upper surface, said container having a bottom, said method comprising the steps of:

mounting an air supply pipe in said container above said bottom to define a space between said bottom and said pipe;

providing two separate buoyant annular rings in said container, each of said rings floating at or near the upper surface of said waste on one or the other of the sides of said pipe;

extending said tube through said space to define first and second ends of said tube and a middle of said tube positioned under said pipe;

connecting each of said ends of said tube one of said buoyant rings to extend said tube and provide an elongated support for said microorganisms;

repeating said providing, extending and connecting steps with a plurality of rings and tubes, with said tubes located relative to said pipe either at a common axial location or at spaced axial locations or both such axial locations;

connecting all of said rings which are on one side of said pipe to each other to form a first unit;

connecting all of said rings which are on the other side of said pipe to each other to form a second unit; and flowing air from said pipe to induce an upward flow of said waste above said pipe, said upward flow maintaining each of said units apart from the other of said units to extend said tubes from said middle.

* * * * *